Jan. 13, 1970    M. J. CAPARONE    3,489,350
THERMOSTATICALLY CONTROLLED BURNER VALVE
WITH HIGH AND LOW FEED RATES
Original Filed March 6, 1968    2 Sheets-Sheet 1

INVENTOR
MICHAEL J. CAPARONE

Christen, Sabol and O'Brien
ATTORNEYS

Jan. 13, 1970

M. J. CAPARONE 3,489,350

THERMOSTATICALLY CONTROLLED BURNER VALVE
WITH HIGH AND LOW FEED RATES

Original Filed March 6, 1968

INVENTOR
MICHAEL J. CAPARONE

Christen, Sabol and O'Brien
ATTORNEYS

United States Patent Office 3,489,350
Patented Jan. 13, 1970

3,489,350
THERMOSTATICALLY CONTROLLED BURNER VALVE WITH HIGH AND LOW FEED RATES
Michael J. Caparone, Arcadia, Calif., assignor to Robertshaw Controls Company, Richmond, Va., a corporation of Delaware
Continuation of application Ser. No. 711,049, Mar. 6, 1968. This application Feb. 3, 1969, Ser. No. 805,084
Int. Cl. F23n 5/04; G05d 23/08
U.S. Cl. 236—68          18 Claims

ABSTRACT OF THE DISCLOSURE

A fluid flow control system in which a main diaphragm operated valve controls the main fluid flow and a bleed line flow controls the operation of the main diaphragm operated valve; the bleed line flow is subject to on-off control by a first thermostat and to pressure regulation by a second thermostat which provides low and high regulating settings for the bleed line pressure regulator.

This is a continuation of application Ser. No. 711,049, filed Mar. 6, 1968.

BACKGROUND OF THE INVENTION

Field of the invention

This invention relates to a fluid flow control system for controlling and regulating the pressure of a fluid flow and, in particular, to such a system wherein the fluid flow operation is subject to control by a bleed line flow.

Description of the prior art

The prior art, as exemplified by U.S. Patents No. 3,227,370, No. 3,235,180 and No. 3,260,459, is cognizant of the general arrangement of a fluid flow control having a differential pressure operated diaphragm valve for main flow control and regulation with a bleed line flow for operating the diaphragm valves in response to an on-off bleed control and a bleed pressure regulator, both of which are actuated by thermostatic operators.

SUMMARY OF THE INVENTION

The present invention is sumarized in a flow control system wherein a casing has a main diaphragm valve operated by a bleed line which includes a bypass bleed flow to assure closure of the main diaphragm valve, an on-off control for an outlet portion of the bleed line, and a pressure regulator in such outlet portion; first thermostatic means operates the on-off control and second thermostatic means moves the pressure regulator between regulating settings.

An object of the present invention is to correlate bleed flow regulation and control in a flow control system utilizing the bleed principle for main valve operation.

The present invention has another object in that a flow control system operating on the bleed principle has dual inlet bleed portions and an outlet bleed portion which has thermostatic means for both on-off control and pressure regulating adjustment.

Other objects and advantages of the present invention will become apparent from the following description taken in conjunction with the accompanying drawings.

DESCRIPTION OF THE PREFERRED EMBODIMENTS

Figure 1:
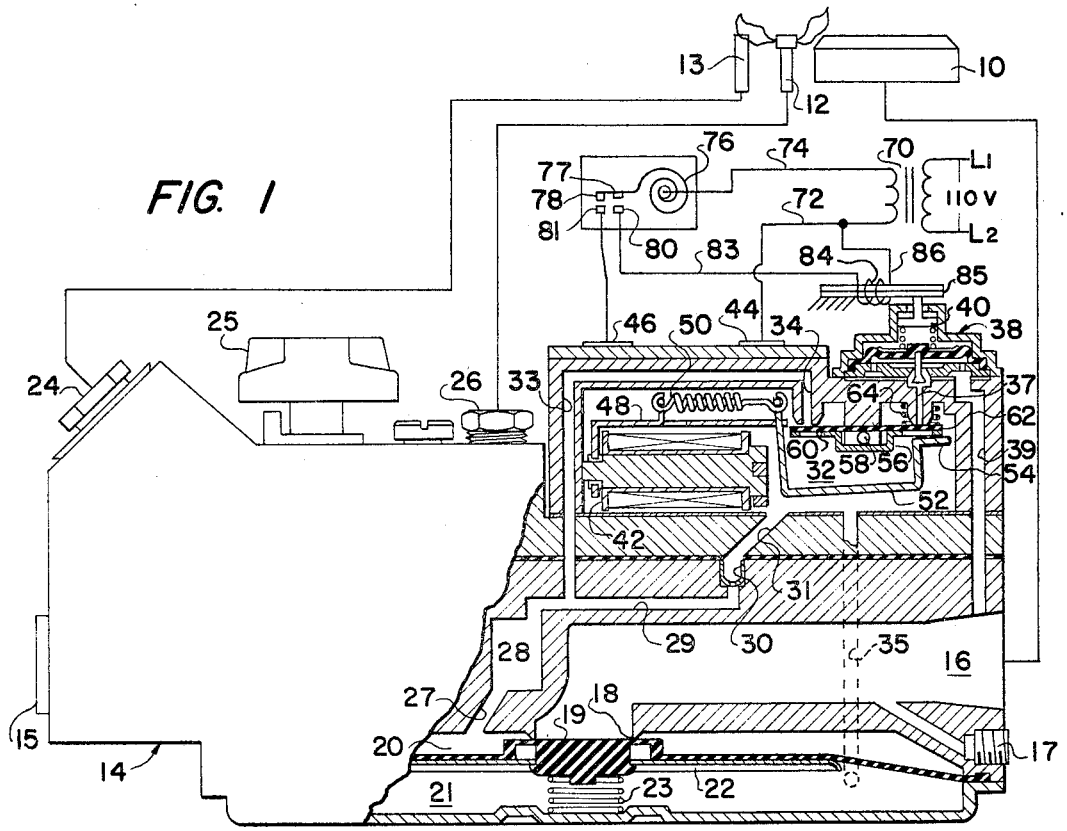
FIG. 1 is a schematic diagram of a flow control system embodying the present invention with a control device being broken away to show parts in section.

While the present invention is applicable to various types of temperatures controls for heating and/or cooling apparatus, it will be described in connection with burner apparatus of the heating type. Such apparatus, as shown in FIG. 1, includes a main burner 10, a pilot burner 12 located in igniting proximity to the main burner 10, and a thermocouple 13 disposed in the flame of the pilot burner 12; the main burner 10 is part of a furnace (not shown) supplying heat to a particular area which includes any suitable type of temperature responsive element.

The flows of fuel to the main and pilot burners 10 and 12 are controlled by a combination control device embodied in a hollowed casing indicated generally at 14, having an inlet port 15 on one end connected to a suitable fuel supply such as a gas source (not shown) and a main outlet port 16 on an opposite end connected to the main burner 10 by a suitable conduit. Adjacent the outlet port 16, the casing 14 is provided with a sealed pressure tap connection 17 which may be unsealed and connected to a pressure gage for testing and/or measuring the outlet flow of the fuel; however, the connection 17 is not an operative part of the control apparatus and may be eliminated if so desired. The inlet and outlet ports 15 and 16 are disposed on a common axis with a valve seat 18 intermediately located therebetween. A flow through the valve seat 18 is controlled by a flexible diaphragm defining a main valve member 19. The periphery of the diaphragm valve 19 is clamped between adjacent sections of the casing 14, which are secured together as by cap screws (not shown). The main diaphragm valve 19 separates a hollow cavity of the casing into an inlet pressure chamber 20 and an operating pressure chamber 21. A back-up plate 22 is secured to the undersurface of diaphragm 19 and a coil spring 23 is mounted in compression between the bottom casing wall of the operating pressure chamber 21 and the back-up plate 22 whereby the diaphragm valve 19 is biased toward engagement with the valve seat 18.

A safety holding device 24 is connected to the thermocouple 13 so as to be energized in response to a flame at the pilot burner 12. The safety holding device 24 may be of any conventional type, the structure and operation of which are so well known that a detailed description is omitted for the sake of brevity. The safety holding device 24 includes an electromagnetic valve (not shown) disposed to control the fluid flow in the inlet 15. The arrangement is such, that extinguishment of the flame at the pilot burner 12 causes cooling of the thermocouple 13 and subsequent deenergization of the electromagnetic valve cuts off all fluid flow in the inlet 15.

Downstream of the safety holding device 24, the fluid flow therefrom is subject to control of a manually rotatable plug valve (not shown) which is rotated between "off," "pilot" and "on" positions by a dial knob 25. The particular structure of the rotatable plug valve may take any conventional form so a detailed description thereof is omitted. For a complete description of the rotatable plug valve, the safety holding device and the interlock therebetween, reference is made to U.S. Patent No. 2,880,936. The plug valve also controls a pilot flow of fluid from the inlet 15 to the pilot outlet 26 which is connected by suitable tubing to the pilot burner 12; such pilot flow means is also shown and fully described in U.S. Patent No. 2,880,936.

Downstream of the manual plug valve and upstream of the main valve seat 18, the casing 14 has a bleed line conduit 27 leading from the inlet pressure chamber 20 to a bleed line filter cavity 28 which communicates with a pair of branch bleed lines. The first branch bleed line includes a bleed passage 29, a flow restrictor 30 and a bleed passage 31 communicating with a valve chamber 32. The second branch bleed line has a bleed passage 33 terminating in an inlet valve seat 34 that communicates with the valve chamber 32. An open bleed line passage 35 from the valve chamber 32 extends to the underside of the main diaphragm 19 into communication with the operating pressure chamber 21.

A controlled bleed line passage from the bleed valve chamber 32 includes an outlet valve seat 36, a bleed passage 37, a bleed line pressure regulator 38, and a bleed passage 39 establishing communication between the outlet side of the regulator 38 and the main outlet port 16. The pressure regulator may be of any conventional type and includes a regulating valve regulating the bleed line flow from passage 37 into a regulating chamber which communicates with the bleed line outlet passage 39. A movable wall of the regulating chamber is defined by a flexible diaphragm having one side attached to the regulating valve and its opposite side being subject to atmospheric pressure by a suitable vent in the regulating housing; a coil spring biases such opposite side of the flexible diaphragm and is mounted in compression between a central portion of such opposite side and an actuator 40 that has a stem extending through the vent in the housing. The actuator 40 is operable to change the bias of the spring acting on the diaphragm and thus position the regulator valve to particular regulator settings.

For control of the two valve seats 34 and 36, the bleed valve chamber 32 houses actuating mechanism which may be of any suitable type such as an hydraulic actuator, an electrical actuator, etc. In the form illustrated in FIG. 1, an electrical actuator is utilized and includes an electromagnetic device 42 having a core fixedly supported to a casing wall in the chamber 32 and an electrical coil wound thereon and electrically connected by lead wires (not shown) to the terminal posts 44 and 46 for connection in a control circuit to be described hereinafter. The supporting frame 48 for the electromagnetic device 42 has an attaching ear for a coil spring 50 and a fulcrum for a generally U-shaped armature 52; the coil spring 50 is mounted in tension between such attaching ear and one end of the armature 52. The opposite end of armature 52 has a flange 54 defining an operative connection for a dual valve plate 56. The valve plate 56 is pivoted intermediate its ends to a pivot pin 58 carried by the casing wall between the bleed valve seats 34 and 36. The top of valve plate 56 is covered with resilient material so that one end defines a valve member 60 cooperating with the bleed inlet valve seat 34 and the opposite end defines a valve member 62 cooperating with the bleed outlet valve seat 36. A coil spring 64 is mounted in compression between an internal casing wall and the valve member 62 to bias the valve plate 56 clockwise about its pivot 58.

The casing 14 and its components are shown schematically arranged in FIG. 1 in order to facilitate their descriptions and to illustrate in a clear manner the external connections for the components. The valve casing 14 may be integrally cast or molded but ease of assembly is enhanced by utilizing separate casing sections having suitable gaskets therebetween and secured together as an integral unit by suitable fastening means such as cap screws (not shown).

An electric control circuit for the control device includes a pair of power leads $L_1$ and $L_2$ connected to any suitable power such as a 110 volt source and to the primary winding of a 24 volt step down transformer 70. One conductor 72 from the secondary winding of the transformer 70 is connected to the terminal post 44 and a second conductor 74 is connected to the center post of a spiral bimetal 76, the free end of which carries a pair of spaced contacts 77 and 78 for movement into and out of engagement with a pair of fixed contacts 80 and 81, respectively. The bimetal 76 and the cooperating contacts constitute a room or space thermostat that is disposed in the space being supplied with heat from the burner 10. The fixed contact 81 is connected by a conductor 82 to the terminal post 46. The fixed contact 80 is connected by a conductor 83 to one end of a heating coil 84 wound on a bimetal strip 85; the other end of the coil 84 is connected by a conductor 86 to the conductor 72. The bimetal strip 85 has one end fixed to a wall portion of casing 14 and its opposite end disposed for engagement with the regulator actuator 40.

In order to commence operation of the system described above, the plug valve dial 25 is rotated from its "off" position to its "pilot" position and the safety device 24 is reset to its open position by manually depressing the reset operator which may be associated with the dial 25 or may be a separate push button (not shown). A pilot flow of fuel is thus permitted to the pilot outlet 26 and thence to the pilot burner 12 where it is ignited by any suitable means, such as a match. As soon as the thermocouple 13 generates sufficient voltage to energize the electromagnet of the holding device 24, the depressed push button may be released. The plug valve dial 25 is now rotated to its "on" position whereby the pilot flow of fuel is maintained and the main flow of fuel is permitted to enter the inlet pressure chamber 20.

The relative positions of the control components are now disposed as illustrated in FIG. 1. A bleed flow proceeds from the inlet pressure chamber 20 through the bleed line conduit 27 the bleed line filter cavity 28 and both branch bleed lines 29–30–31 and 33–34 into the bleed valve chamber 32, thence through the always opened bleed line passage 35 to the operating pressure chamber 21. With such an arrangement the inlet pressure chamber 20 and the operating pressure chamber 21 are subject to inlet pressure and there is no pressure differential between the opposite side of the main diaphragm valve 19 which is accordingly biased to its closed position on the main valve seat 18 by the coil spring 23. Closure of the main valve seat 18 prevents any flow to the main burner 10 so it is apparent that the space thermostat 76 is in a satisfied or opened condition as shown in FIG. 1.

Figure 2:
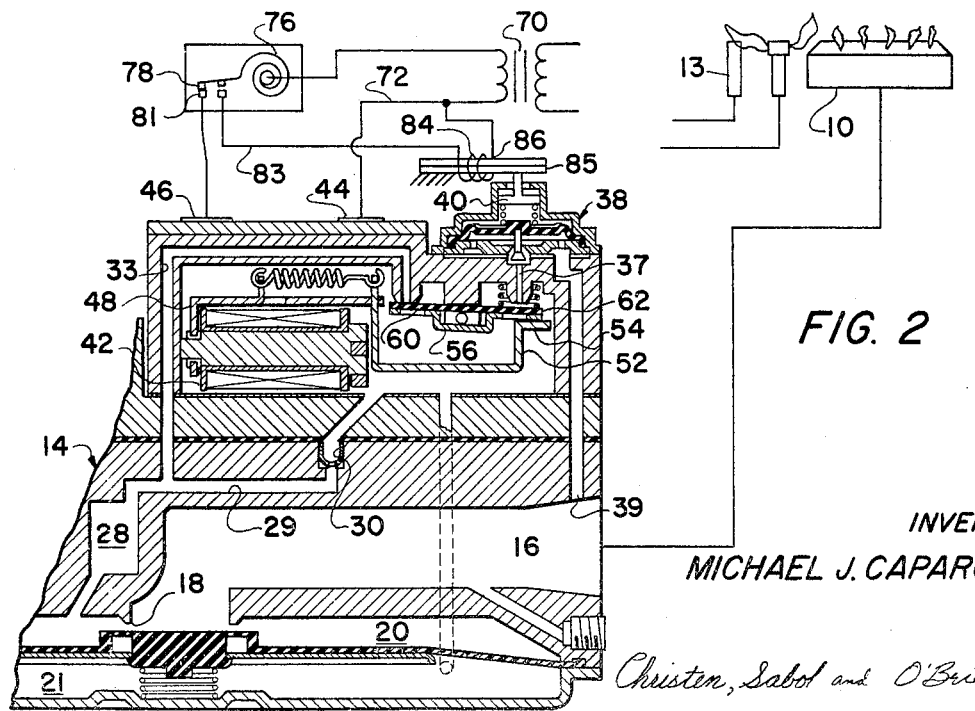
FIG. 2 is a partial schematic diagram of FIG. 1 with parts shown in a first operative position.

When the space thermostat 76 becomes unsatisfied, i.e., when there is a demand for heat, the bimetal 76 coils whereupon the contacts 78–81 are closed to complete an energizing circuit for the coil of the electromagnet 42, which is traced as follows: from the secondary winding of the transformer 70 through the conductor 74, the spiral bimetal 76, the contacts 78 and 81, the terminal post 46, the coil of the electromagnet 42, the terminal post 44 and the conductor 72 back to the secondary winding. The control components are now positioned as shown in FIG. 2 wherein the armature 52 is pivoted clockwise against the bias of tension spring 50. The armature flange 54 then releases the adjacent end of the valve plate 56 which is pivoted clockwise about the pin 58 by the action of the coil spring 64 whereupon the bleed line valve seat 34 is closed and valve seat 36 is opened. Closure of the valve seat 34 cuts off the unrestricted bleed flow from the bleed passage 33 into the bleed valve chamber 32 but the restricted bleed flow from the bleed passage 31 is permitted. With the valve seat 36 opened, the bleed valve chamber 32 is vented to the outlet 16 in a path traced through the bleed passage 37, the bleed line pressure regulation 38 and the outlet bleed passage 39; at the same time the operating pressure chamber 21 is depressurized by being bled to the lower pressure chamber 32 since the bleed line passage 35 is always in communication with the bleed valve chamber 32. Depressurization of the operating pressure chamber 21 causes the main diaphragm valve 19 to move to an open position because the pressure differential on the top side thereof from the higher pressure of the inlet pressure chamber 20. The main diaphragm valve 19 now assumes its first regulating position to regulate the pressure of the fluid flow to the main burner 10.

Figure 3:
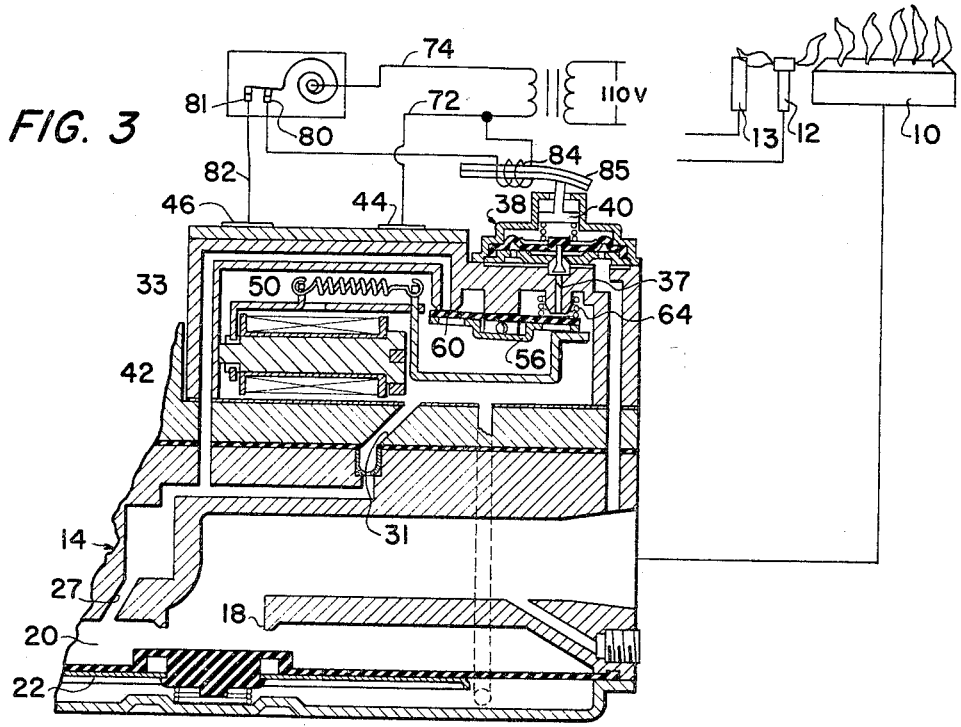
FIG. 3 is a partial schematic diagram similar to FIG. 2 but with parts shown in a second operative position.

The space thermostat shown in FIGS. 1, 2 and 3 comprises a two stage thermostat with contacts 78 and 81 being closed before contacts 77 and 80 are closed. Accordingly, the pressure regulator 38 by design has a first setting that is correlated with the closure of the first stage contacts 78 and 81 of the space thermostat 76. The first setting of the pressure regulator 38 is termed a low setting that limits the rate of bleed flow to the bleed line outlet sensing port 39 so that the regulating position of the main diaphragm valve 19 also assumes a low regulating position. With this arrangement, the main burner 10 is supplied with a low rate of fuel to satisfy the heating demand.

If the heating demand is not satisfied, the second stage of the thremostat 76 comes into operation by closure of the second stage contacts 77 and 80. This completes a parallel circuit for the heater coil 84 as follows: from the secondary winding of the transformer 70 through the conductor 74, the spiral bimetal 76, the closed contacts 77–80, the conductor 83, the heater coil 84, the conductor 86 and the conductor 72 back to the secondary winding. The control components are now in position as illustrated in FIG. 3 wherein the heated bimetal strip 85 deflects against the actuator 40 to displace the regulating valve of the regulator 38 to a second or high setting. Thus, the rate of bleed flow to the bleed line outlet sensing port 39 increases so that the regulating position of the main diaphragm valve 19 is increased to a high regulating position.

When the temperature requirements of the space being heated are satisfied, the operation of the burner 10 is reversely staged in response to opening of the contacts 77–80 whereby the heater coil 84 is deenergized and the cooled bimetal 85 returns to its normal position shown in FIG. 2. The system may function at the low burner rate shown in FIG. 2 for as long as the heat output equals the heat loss in the space. This arrangement has the advantages of maintaining the heated space at an even heat level and eliminating the temperature gap normally occasioned by on-off cycling of the main burner. By the same arrangement it is possible that for particular heat loss conditions, there would be no need for high burner operation so that in response to heat demand, only the contacts 78–81 will close and open and the main burner 10 will cycle between low flame and off operations.

The opening of contacts 77–80 and 78–81 upon satisfaction of the heat demand deenergizes the heater coil 84 first and then deenergizes the electromagnetic 42 which causes the armature lever 52 to pivot counterclockwise (as viewed in FIG. 1) whereby the bleed valve seat 36 is closed and the bleed valve seat 34 is opened. At this time, there is no bleed flow out of the bleed valve chamber 32 and the bleed flows from both the restricted passage 31 and the unrestricted or bypass passage 33 into the bleed valve chamber 32 proceeding through the bleed passage 35 into the operating pressure chamber 21 which is again pressurized causing closure of the main diaphragm valve 19 so there is no fuel flow to the main burner 10. This arrangement has the particular advantage of insuring the off position of the main valve 19 because of the opened unrestricted bleed passage 33. Even if the orifice 30 should not function properly, as by being clogged in spite of the many filtering devices upstream thereof, the bypass bleed passage 33 will provide the necessary bleed flow to pressurize the operating pressure chamber 21. In addition to providing positive main valve closure independently of the bleed line restricting orifice 30, the unrestricted bleed line passage 33 assures that such closure will be at a rapid rate. Since the bleed valve members 60 and 62 are located on the same valve plate 56, simultaneous actuation occurs so that closure of the outlet bleed passage 37 results from deenergization of the electromagnet 42.

The main burner 10 will be cycled thermostatically in accordance with the temperature demand sensed by the thermal sensor 76. In the event the flame at the pilot burner 12 should be extinguished for ony reason, the thermocouple 13 will cool and the electromagnetic coil of the holding device 24 will be deenergized causing shut off of all fuel flows. To reestablish the flame at the pilot burner 12, the igniting procedure outlined above must be repeated, i.e., the dial 25 must be rotated to its "pilot" position before the reset operator can be depressed to a reset position.

Figure 4:
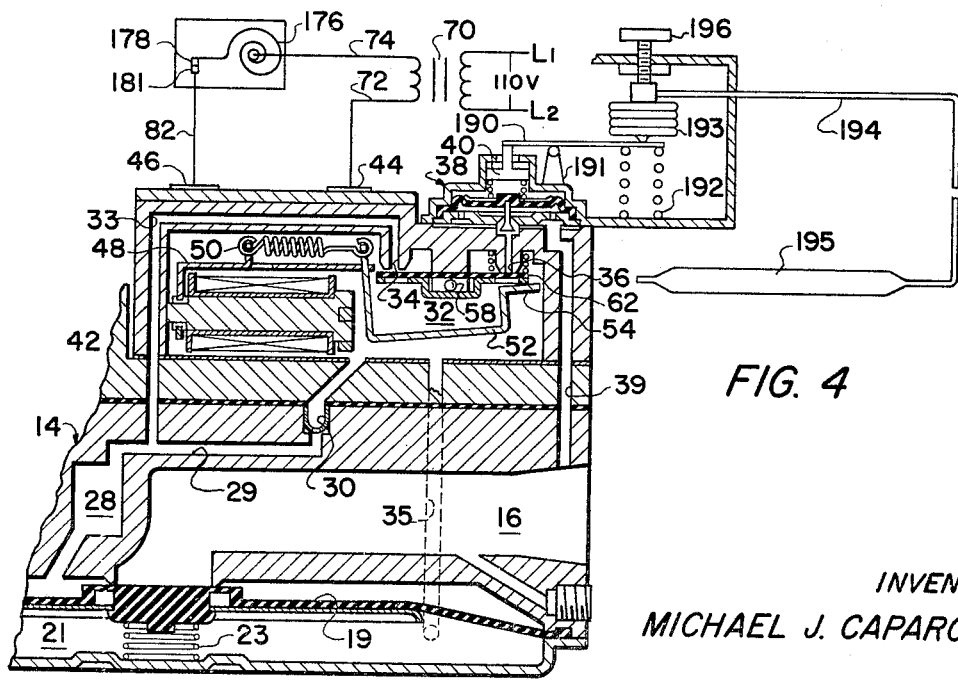
FIG. 4 is a partial schematic diagram similar to FIG. 1 but showing a modification thereof.

In the following description of the modifications shown in FIG. 4, the same reference numerals are utilized for those parts already described in connection with FIGS 1–3, while new reference numerals in the 100 series are utilized for new elements shown in FIG. 4 and only the new elements will be described in detail. As shown in FIG. 4, the spiral bimetal 176 is only a single stage thermostat having only one contact 178 on its free end for cooperation with a fixed contact 181.

Movement to the pressure regulator actuator 40 is imparted by one end of a lever 190 intermediately pivoted to a fulcrum 191 mounted on a wall portion of the casing 14. A coil spring 192 is mounted in compression between a wall portion of casing 14 and the other end of lever 190 for biasing the same in a counterclockwise direction. A contracting and expanding bellows 193 engages the lever 190 in opposition to the coil spring 192. A capillary tube 194 has one end communicating with the bellows 193 and an other end communicating with a temperature responsive bulb 195. The bellows 193, capillary tube 194 and thermal bulb 195 are filled with a temperature responsive fluid and constitute a temperature responsive system that causes the bellows 193 to expand and contact in response to temperature variations sensed by the bulb 195. An adjusting screw 196 is threaded through a wall portion of the casing 14 and engages the fixed end of bellows 193 to adjust the force exerted thereby on the lever 190.

The overall operation of the modification of FIG. 4 is similar to that described above with respect to FIG. 1, except for the movement of the pressure regulator 38 between its low and high pressure regulating setting. By means of the adjusting screw 196, the force exerted by lever 190 on the regulator actuator 40 corresponds to a low setting which is correlated to the "on" position of the space thermostat 176. Thus, when the space thermostat 176 calls for heat, contacts 178–181 are closed, the electromagnet 42 is energized and the bleed valve seat 36 is opened whereby the main burner is supplied with fuel at a low rate as similarly shown in FIG. 2.

The thermal bulb 195 is remotely located in any suitable position, such as in the return air duct of a forced air heating system whereby colder return air as sensed by the bulb 195 results in an increase in the regulator setting. The pressure regulator actuator 40 is not moved in steps between low and high settings as does the modification of FIGS. 1–3 but rather the actuator 40 of FIG. 4 is provided with a modulated movement in accordance with the sensed temperature variations. Thus, the main burner 10 is provided with on-off step operation at its first stage and with modulation operation for its second stage. This arrangement has the particular advantage of increasing (or decreasing) the fuel flow to the main burner at an increasing (or decreasing) rate in response to temperature variations.

Inasmuch as the present invention is subject to many variations and changes in details, it is intended that all matter contained in the foregoing description or shown on the accompanying drawings, shall be interpreted as illustrative and not in a limiting sense.

What is claimed is:

1. In a control system for a fluid flow, the combination comprising a casing having inlet and outlet means and main valve means for controlling a fluid flow therebetween, diaphragm means for moving said main valve means and cooperating with a wall portion of said casing to define an operating pressure chamber, bleed flow means having inlet and outlet portions and an intermediate portion communicating with said operating pressure chamber to cause actuation of said diaphragm means, said inlet portion of said bleed flow means including a pair of branch bleed lines communicating with said intermediate portion, one of said branch bleed lines defining an unrestricted bleed passage and the other defining a restricted bleed passage, automatically operated bleed valve means movable between on-off positions to control said unrestricted bleed passage, thermostatic means for operating said bleed valve means between its on-off positions, pressure regulating means in said outlet portion and having first and second settings for pressure regulation of a bleed flow in said outlet portion, and thermally responsive means for moving said pressure regulating means between its first and second settings.

2. The invention as recited in claim 1 wherein the on position of said bleed valve means coincides with the first setting of said pressure regulating means.

3. The invention as recited in claim 1 wherein said thermally responsive means includes a bimetal element and a heating coil therefor.

4. The invention as recited in claim 3 wherein energization of said heating coil is controlled by said thermostatic means.

5. The invention as recited in claim 4 wherein said thermostatic means comprises a two stage thermostat having one stage controlling operation of said bleed valve means and another stage controlling the energization of said heating coil.

6. The invention as recited in claim 3 wherein said thermostatic means comprises an electrical thermostat having one set of contacts controlling operation of said bleed valve means and another set of contacts controlling energization of said heating coil.

7. The invention as recited in claim 1 wherein said thermally responsive means includes modulation means to modulate said pressure regulating means between its first and second settings.

8. The invention as recited in claim 7 wherein said thermally responsive means includes a pivoted lever having one end operatively associated with said pressure regulating means, and thermal expanding and contracting means operatively engaging another end of said pivoted lever.

9. The invention as recited in claim 8 wherein said thermally responsive means includes a remotely located thermal sensing bulb and said expanding and contracting means includes bellows means connected to said thermal sensing bulb.

10. In a control system for a fluid flow, the combination comprising a casing having inlet and outlet means and a main flow passage therebetween, main valve means in said main flow passage for controlling a main fluid flow therebetween, diaphragm means for moving said main valve means and cooperating with a wall portion of said casing to define an operating pressure chamber, bleed flow passage means between said inlet and outlet means for a bleed fluid flow therebetween, said bleed flow passage means including an intermediate portion communicating with said operating pressure chamber to cause actuation of said diaphragm means, automatically operated bleed valve means movable between on-off positions to control said bleed flow passage means, thermostatic means for operating said bleed valve means between its on-off positions, pressure regulating means in said bleed flow passage means and having first and second settings for pressure regulation of the bleed fluid flow through said bleed flow passage means, and thermally responsive means for moving said pressure regulating means between its first and second settings.

11. The invention as recited in claim 10 wherein the on position of said bleed valve means coincides with the first setting of said pressure regulating means.

12. The invention as recited in claim 10 wherein said thermally responsive means includes a bimetal element and a heating coil therefor.

13. The invention as recited in claim 12 wherein energization of said heating coil is controlled by said thermostatic means.

14. The invention as recited in claim 12 wherein said thermostatic means comprises a two stage thermostat having one stage controlling operation of said bleed valve means and another stage controlling energization of said heating coil.

15. The invention as recited in claim 12 wherein said thermostatic means comprises an electrical thermostat having one set of contacts controlling operation of said bleed valve means and another set of contacts controlling energization of said heating coil.

16. The invention as recited in claim 10 wherein said thermally responsive means includes modulation means to modulate said pressure regulating means between its first and second settings.

17. The invention as recited in claim 16 wherein said thermally responsive means includes a pivoted lever having one end operatively associated with said pressure regulating means, and thermal expanding and contracting means operatively engaging another end of said pivoted lever.

18. The invention as recited in claim 17 wherein said thermally responsive means includes a remotely located thermal sensing bulb and said expanding and contracting means indicate bellows means connected to said thermal sensing bulb.

References Cited

UNITED STATES PATENTS

| | | | |
|---|---|---|---|
| 3,260,459 | 7/1966 | Caparone et al. | 236—68 X |
| 3,307,785 | 3/1967 | Currie | 236—80 |
| 3,433,409 | 3/1969 | Jackson et al. | 236—80 X |

WILLIAM E. WAYNER, Primary Examiner

U.S. Cl. X.R.

236—80, 84; 251—45